Nov. 3, 1931.  C. N. FAIRCHILD  1,830,265
TWO-HAND LOCK
Filed Feb. 18, 1928   2 Sheets-Sheet 1
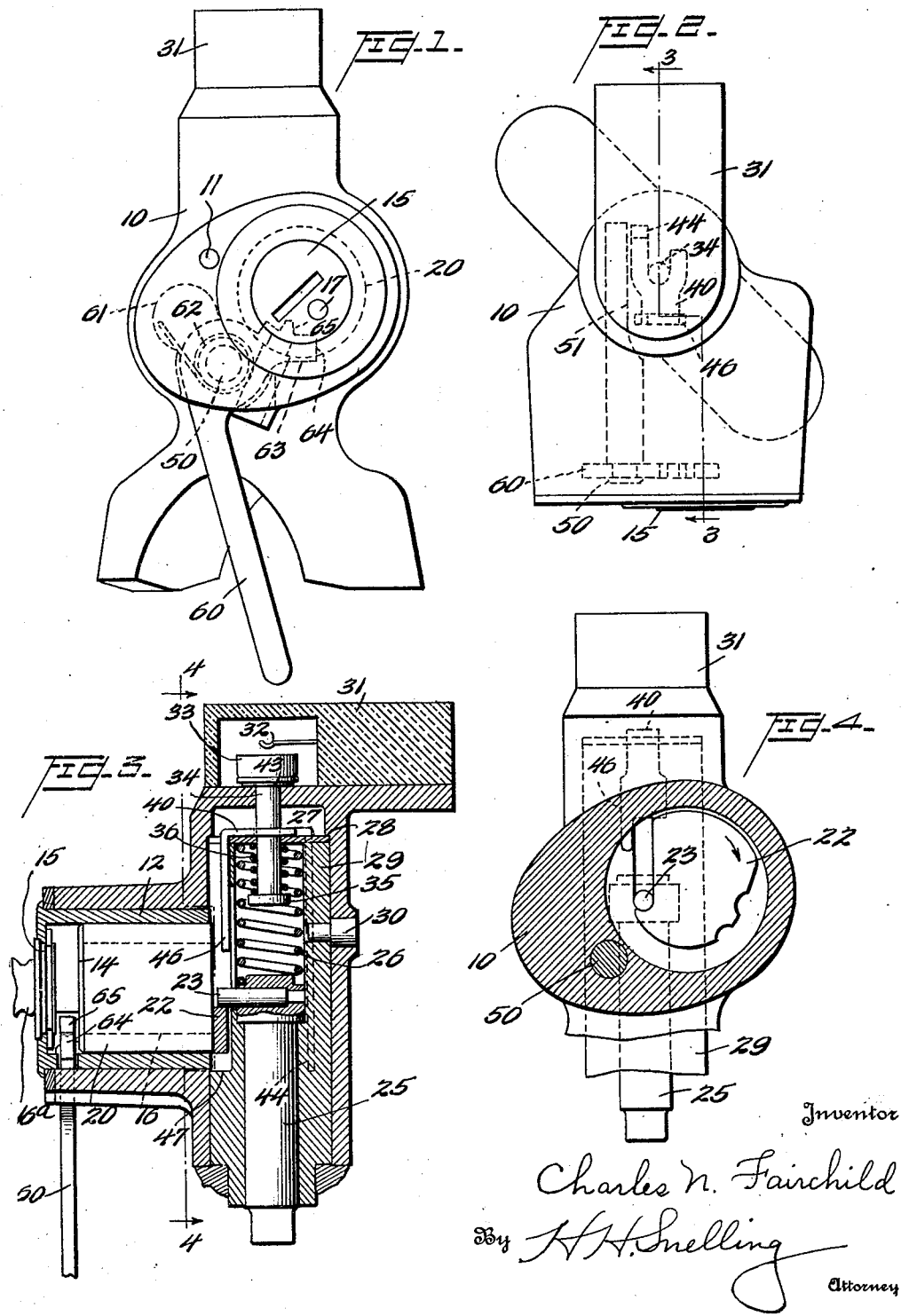
Inventor
Charles N. Fairchild
By H. H. Snelling
Attorney Nov. 3, 1931.  C. N. FAIRCHILD  1,830,265
TWO-HAND LOCK
Filed Feb. 18, 1928  2 Sheets-Sheet 2
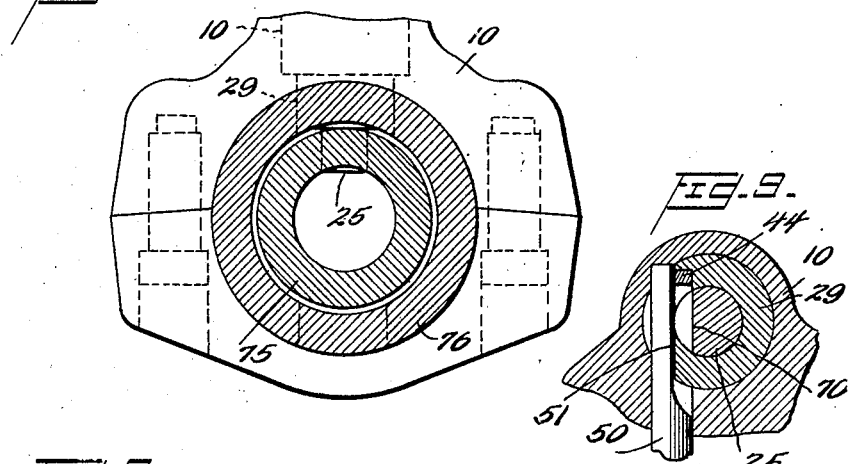
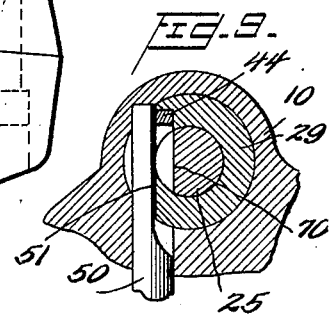
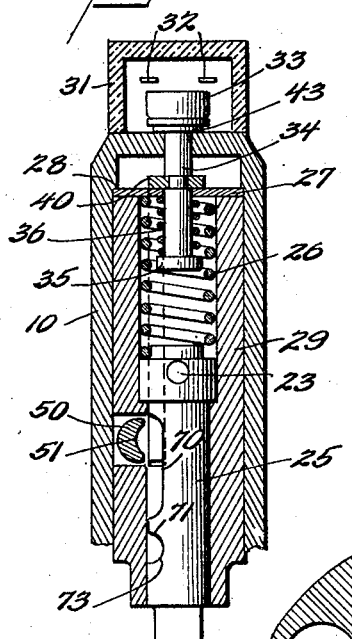
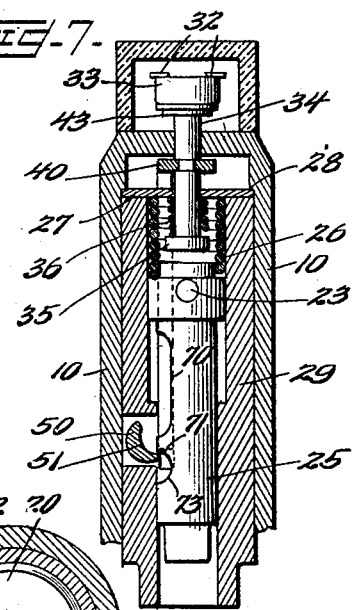
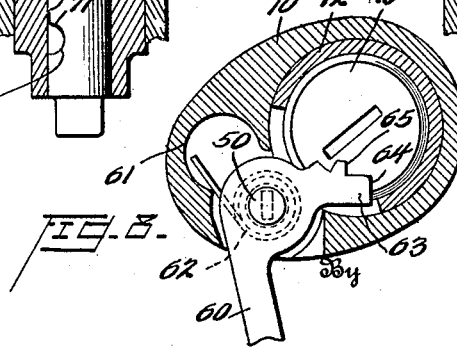
Inventor
Charles N. Fairchild
H. H. Snelling
Attorney Patented Nov. 3, 1931

1,830,265

UNITED STATES PATENT OFFICE

CHARLES N. FAIRCHILD, OF PLANTSVILLE, CONNECTICUT, ASSIGNOR TO FAIRCHILD LOCK CORPORATION, OF PLANTSVILLE, CONNECTICUT, A CORPORATION OF DELAWARE

TWO HAND LOCK

Application filed February 18, 1928. Serial No. 255,440.

This invention relates to automobile locks and has for its principal object the provision of a lock which controls the ignition and is so arranged that it is difficult if not impossible for the driver to lock his car, with a consequent shutting off of the ignition, without the use of both of his hands, thus materially reducing if not eliminating entirely the accident hazard which might occur thru a jolting or knocking or absent-minded locking of the car while driving and in which position one of the driver's hands would naturally be on the wheel.

A further object of the invention is the provision of positive means for controlling the opening and closing of the ignition circuit without cooperation of the locking bolt itself, the ignition circuit being closed directly by the cam fast to the locking cylinder and being raised by movement of a rock shaft. Other objects of the invention relate more particularly to the forms and combinations of the various parts, these objects being particularly set forth in the claims.

In coincidental locks, particularly those secured to the steering post casing so as to lock the steering wheel from movement, or to render it entirely free, there is an accident hazard, not great it is true, but nevertheless one that cannot be overlooked, occurring thru a driver absent-mindedly locking the car against steering by the hand that is not occupied by steering. Usually the driver has both hands on the steering wheel but particularly toward the end of a long tiresome trip one is prone to steer with just one hand and under just such conditions an accident sometimes has occurred in the way indicated. In the present invention the parts of the lock are so constituted and arranged that the locking bolt can be moved to position to lock the steering post only by taking both hands off the steering wheel, and this act of locking the wheel can therefore never be done absent-mindedly while driving.

In the drawings:—

Figure 1 is a side elevation.

Figure 2 is a top plan view.

Figure 3 is a section taken on the broken line 3—3 of Figure 2.

Figure 4 is a section taken on line 4—4 of Figure 3.

Figure 5 is an elevation of the lower portion of the housing showing the connection with the housing cap.

Figure 6 is a section thru the center line of the locking bolt but at right angles to the section shown in Figure 3.

Figure 7 is a view similar to Figure 6 but showing the parts in the 360° position.

Figure 8 shows the manual lever in plan.

Figure 9 shows a section thru the inner end of the rock shaft.

Referring particularly to Figure 3 the lock barrel 20 is permanently secured to the housing 10 by the pin 11 shown in Figure 1, this pin also holding in place the lock case 12 which is sufficiently long axially to leave a considerable space between the front end 14 of the lock cylinder and the front face of the case 12. A slotted swivel 15 is free to revolve in the front face of the case 12 but is secured to revolve with the lock barrel 16 by means of the pin 17 seen in Figure 1. At the rear the barrel 16, which is concentric with the lock cylinder, has secured to it a cam 32 which engages a transverse pin 23 permanently secured in the head of the locking bolt 25. Proper rotation of the key 16ª moves the cam 22 so as to lift the locking bolt 25 against the spring 26 which engages the head of the bolt 25 at one end and at the other end engages a disk 27 seated in a small shoulder 28 in the housing being held against this shoulder by the locking of the cartridge case 29 to the housing by means of the pin 30.

At the top of the housing is mounted a switch box 31 preferably containing a pair of spring contact fingers 32 in a position to be bridged by a metallic cup 33 carried by but insulated from the stem 34 and having a head 35 between which and the plate 27 is mounted a spring 36 serving normally to press the head 35 toward the head of the locking bolt. In the down position of the stem shown in Figure 3 the follower 40, fast to the stem, rests upon the plate 27 and at the same time the washer 43 rests on the top surface of the housing 10, the spring 36 holding the parts in this position.

The follower 40 has two dependent portions or legs, one of which, bearing the numeral 44, see Figure 3, is shown as extending to the level of the bottom of the rock shaft 50 while the shorter leg 46 projects in a space between the cartridge case 29 and the housing, this space being formed by slabbing off a portion of the case 29 which is otherwise cylindrical. The edge of this slab is numbered 47.

When the lock cylinder is turned by means of the key 16ª the cam 22 engages the pin 23 lifting the locking bolt 25. The cam 22 in turning approximately 180° from the locked position engages the lower tip of the leg 46 and lifts the stem 34 so as to complete the circuit thru the two contacts 32 thus closing the circuit.

The rock shaft 50 is generally cylindrical but is cut away as at 51 in Figure 2 so as not to interfere with movement of the locking bolt when the locking bolt is in locked position as in all of the figures except Figure 7. A flat metal handle 60 is fast to the rock shaft and operates it so as to bring the end of the rock shaft into position to interfere with movement of the locking bolt as for example in Figure 7.

A cavity 61 is bored into the housing 10 so as to serve as an anchor or rather stop for the spring 62 which is coiled about the rock shaft 50 and has its other end anchored to the handle 60, holding this handle or lever in the position shown in Figure 1. Such position is the limit of clockwise movement of the handle or lever which however, in absence of the key, may be turned counter-clockwise until its forward edge strikes against the edge of the slot in the housing. The handle 60 has a laterally extending short lever arm 63 having at one side (the bottom side as seen in Figure 8) a face 64 and at the other side a shoulder 65 the active edge or face of which is at right angles to the side or face 64 of the lever arm. The handle or lever 60 is permanently secured to the rock shaft.

Having particular reference to Figures 6 and 7, it will be seen that in the locked position shown in the former figure the rock shaft 50 is so positioned that its cutaway portion 51 permits free movement of the locking bolt but the rock shaft is free to turn, as far as the bolt is concerned, in this position for the bolt is cut away as at 70. In Figure 7, however, the turning of the rock shaft 50 engages a shoulder 71 at the top of a groove 73 in the bolt and prevents a downward movement of the locking bolt to locked position.

The operation of the device is as follows: Assuming the parts to be in locked position, the key 16ª is inserted thru the slot in the swivel 15 which is always in alinement with the lock cylinder which latter in the form illustrated is concentric with the lock barrel and with the lock barrel case 12. There is no obstruction to the insertion of the key, neither is there any bar to the turning of this key forward or in a clockwise direction approximately 320° at which time the key is stopped by its engagement with the shoulder 65 of the lever 60. This is running position and in reaching this position the turning of the lock cylinder has caused the cam 22, which in locking position is in contact with the pin 23, to raise the locking bolt 25 against the action of its spring 26 thereby freeing the steering tube 75 from the steering tube casing 76, and further rotation of the cam 22 has caused contact with the shorter leg 46 of the follower 40 raising the stem 34 and causing the cup 32 to close the ignition circuit either synchronously with or slightly after the unlocking of the steering tube.

Thus in running position the bolt is withdrawn, the stem is in its uppermost position closing the ignition circuit, the rock shaft is held by the spring 62 so as not to interfere with movement of the bolt and while the key is free to turn backward in a counter clockwise direction from running position a limited extent to break the ignition circuit, it is not free to move forward because of the engagement of the key with the shoulder 65 and the impossibility of moving the handle or lever so as to permit further movement of the key. The driver may turn the key backward a sufficient amount to break the ignition circuit but he cannot permit or cause the bolt to move to locking position by further continued movement of the key alone. It is quite advantageous to permit the driver at his own discretion to make and break the ignition circuit at will but it is also important that the driver not be permitted to break the ignition circuit and take the key out of the lock without first locking the car and for this reason the construction of the cam is so made as to prevent backward movement of the key and lock cylinder from running position to the 180° position at which the key can be removed, leaving the parts in the so-called third position with the car unlocked and the ignition off to permit ready moving of the car as for example, in shipping, while preventing its being driven.

Consequently to lock the car from running position at 320° the driver must first back the key a slight amount so as to free the lever which then may be turned to the right and held against its spring while the key is turned to the 360° position where it is stopped by engagement of the key with the face 64. In this 360° position, which is shown in Figure 7, the ignition circuit is closed, the locking bolt is up, the rock shaft is turned so as to hold the locking bolt against its spring and also to hold the ignition cup stem 34 elevated by contact between the rock shaft and the longer leg 44 of the follower. The key in the 360° position can be removed, or it can be moved back, because at this time the rock shaft is holding the bolt in a position where the pin 23 is above the edge of the cam. By removing the key in the 360° position the spring 62 tends to restore the lever and the much heavier spring 26 tends to restore the locking bolt when freed of the rock shaft and by the wedging action of the bolt against the edge of the rock shaft the spring 26 tends to rock the shaft and its lever so that instantly upon withdrawal of the key the locking bolt is shot to locking position and the ignition circuit broken simultaneously therewith. Since it is absolutely impossible for a driver to take any action absent-mindedly while both hands are off the steering wheel and the automobile is being driven, all possibility of an inadvertent locking of the car while in motion is prevented as the lock can only be operated when the driver has both hands free, in other words when the car is still.

What I claim is:

1. In a device to prevent accidental locking of the steering mechanism of a moving automobile thru inadvertent action of the driver of the automobile: the combination with steering mechanism and a locking bolt for disabling the steering mechanism, of means including a manually operated device for moving the locking bolt from driving to locking position and vice versa, and means which must be manually moved simultaneously with the movement of said device in order to move the bolt from driving position to locked position, said two means being so located that the driver must take both of his hands from the driving wheel in order to place the automobile in locked position.

2. In a locking device a spring pressed locking bolt, means for raising the bolt against its spring, an ignition circuit make and break mechanism normally spring pressed to position to break the ignition circuit and a single means for simultaneously engaging the bolt and the make and break mechanism, independently holding the bolt against its spring and the ignition circuit make and break mechanism against its spring.

3. In a coincidental lock, a circuit maker and breaker, a bolt, a cam engaging the bolt to move it to unlocked position, and engaging the circuit maker and breaker to move it in the same direction as the bolt to circuit closing position.

4. The device of claim 3 plus a rock shaft movable to position to hold the bolt and the circuit maker and breaker in the position to which they are moved by the cam irrespective of further movement of the cam.

5. In a coincidental lock, a locking bolt, a circuit maker and breaker, key operated mechanism including a cam for moving the bolt to unlocked position and the circuit maker and breaker to closed position, a rock shaft, and a manually operated means blocking the movement of the key beyond running position until the rock shaft is moved to position to hold the bolt in unlocked position and the circuit maker and breaker in closed position, said manually operated means being so located with respect to the key that the use of both hands of the driver is required to move the rock shaft to bolt retaining position.

6. In a device for preventing accidental disablement of a moving driven automobile thru inadvertent movement by the driver of the automobile of a theft preventing mechanism: the combination with a theft preventing device, of means for operating said device, which means includes two independently operated members which must be manually handled simultaneously in order to move the theft preventing device from passive or driving position to active or theft preventing position, said members being so located with respect to each other as to require the driver to use his right hand to operate one of the members normally while his left hand operates the other member, whereby the driver must remove both of his hands from the steering wheel in order to move the theft preventing mechanism to active or theft preventing position, the said theft preventing device including a spring pressed locking bolt, and in which one of the manually operated members includes a key operated lock and the other manually operated member includes a lever.

7. In a device for preventing accidental disablement of a moving driven automobile thru inadvertent movement by the driver of the automobile of a theft preventing mechanism: the combination with a theft preventing device, of means for operating said device, which means includes two independently operated members which must be manually handled simultaneously in order to move the theft preventing device from passive or driving position to active or theft preventing position, said members being so located with respect to each other as to require the driver to use his right hand to operate one of the members normally while his left hand operates the other member, whereby the driver must remove both of his hands from the steering wheel in order to move the theft preventing mechanism to active or theft preventing position, the said theft preventing device including a spring pressed locking bolt, one of the members is a key operated locking cylinder having a cam to engage the bolt to raise it against its spring and the second members includes a rock shaft which engages the bolt to hold it out of locking position irrespective of the action of the cam.

In testimony whereof I affix my signature.

CHARLES N. FAIRCHILD.